Patented Aug. 12, 1924.

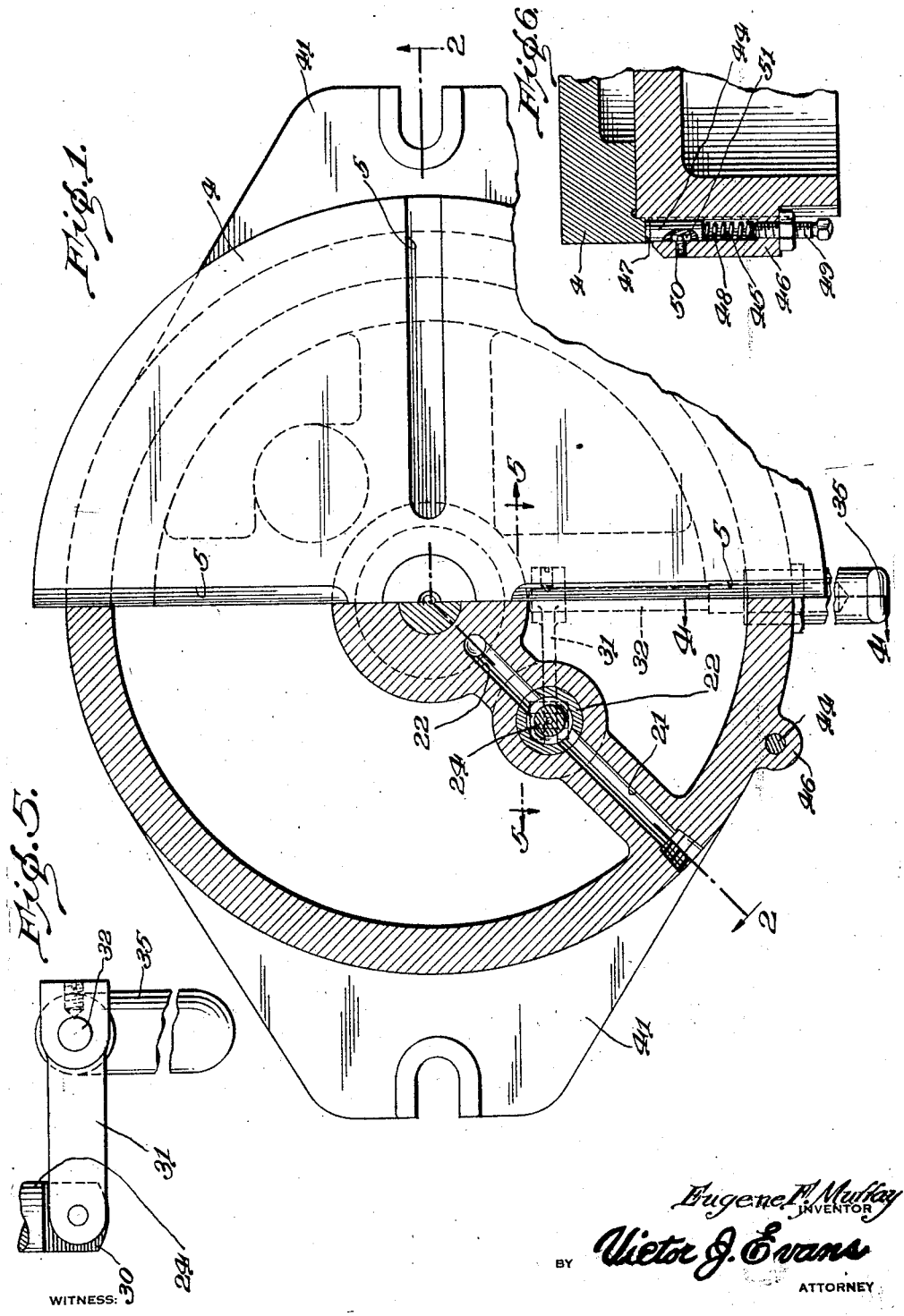

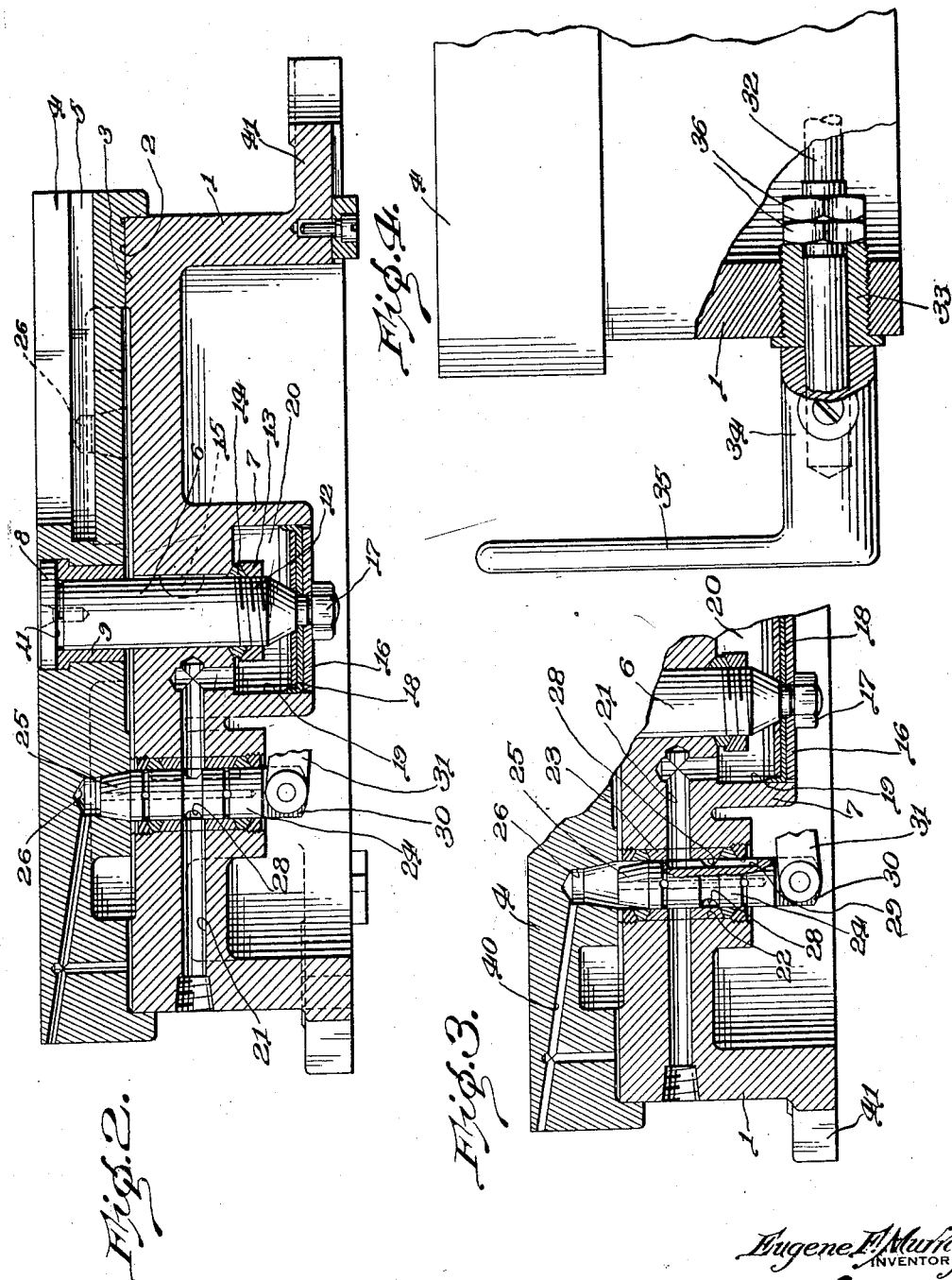

1,505,056

UNITED STATES PATENT OFFICE.

EUGENE F. MURRAY, OF CHICAGO, ILLINOIS.

INDEX BASE.

Application filed January 7, 1922. Serial No. 527,754.

*To all whom it may concern:*

Be it known that I, EUGENE F. MURRAY, a citizen of the United States, residing at Chicago, in the county of Cook and State of Illinois, have invented new and useful Improvements in Index Bases, of which the following is a specification.

This invention relates to index bases or work holders for various types of metal working machines and an object of the invention is to provide an index base which is particularly designed for use on milling machines and which will permit the setting up of a second piece of work while another piece is being worked upon.

It is a well known fact that considerable time of operation of milling machines and analogous machines is lost during the setting up of work thereon resulting in an increased cost of the articles or work, and it is an object of this invention to provide an index base which comprises a rotary table rotatably carried by a support pillow block 1 which is attached directly to the table of the milling machine and also to provide a novel construction, utilizing compressed air for rigidly holding the rotatable table in place during the time one piece is being acted upon by the milling machine, the same means being releasable by the operation of a single lever to permit adjustment of the table as desired.

Other objects of the invention will appear in the following detailed description taken in connection with the accompanying drawings wherein:

Fig. 1 is a top plan, partly in horizontal section, of the improved index base.

Fig. 2 is a section taken on the line 2—2 of Fig. 1 showing the rotatable table in locked position.

Fig. 3 is a fragmentary vertical section through the index base showing the rotatable table in an unlocked position.

Fig. 4 is a detail view, partly in side elevation, and partly in section of the index base and taken on the line 4—4 of Fig. 1.

Fig. 5 is a fragmentary view in side elevation of a part of the index base structure and taken on the line 5—5 of Fig. 1.

Fig. 6 is a detail sectional view of the improved index base.

Referring more particularly to the drawings, the improved index base comprises a stationary support or pillow block 1 which is adapted to be attached to the table of a milling machine or analogous machine, in any suitable manner. The pillow block 1 has an annular bearing surface 2 on its upper face about its outer edge against which the annular bearing surface 3 of the rotatable table 4 engages. The table 4 is circular in plan and is provided with a plurality of diametrically opposed T slots 5 which are adapted to receive suitable clamps for clamping the work upon the rotatable table. The table 4 is rotatably supported by a pin 6 which projects axially through the hub portion 7 of the pillow block 1 and has a head 8 upon its upper end which engages against the upper end of a bearing sleeve 9 carried by the table 4.

Suitable lubricating ducts 11 are provided in the pin 6. The pin 6 is provided with a threaded portion 12 on which a packing nut 13 is mounted, the said packing nut engaging and confining a gasket 14. The pin 6 is feathered in the hub 7 by means of the key 15 to permit it to move vertically relative to the pillow block and to prevent rotary movement of the pin relative to the pillow block. A disc 16 is confined upon the lower end of the pin 6 by means of a nut 17, and a gasket 18 is mounted on the disc 16 and has fluid tight connection with the inner walls 19 of the chamber 20 which is formed in the lower end of the hub 7. The pillow block 1 is provided with a passageway or duct 21 which communicates with the chamber 20 and is adapted to have communication with a supply source of compressed air. The passageway 21 is interrupted by a vertically extending valve receiving chamber 22 in which a bearing sleeve 23 is mounted. The said bearing sleeve has a combined valve and index pin 24 slidably mounted thereon, the upper end 25 of which is shaped for seating in one of the recesses 26 formed in the rotatable table 4 and when the end 25 is seated in one of the recesses 26 the table 4 will be locked against rotary movement. The table 4 is locked against vibratory or vertical movement relative to the pillow block 1 by the passage of compressed air through the duct 21 and into the chamber 20, the said compressed air acting upon the disc 16 and gasket 18 to hold the head 8 firmly in engagement with the sleeve 9 and forcing the bearing surface 3 tightly against the bearing surface 2.

The combined index pin and valve 24 is provided with an annular groove 28 which when the index pin is in table locking position communicates with the duct 21 and permits the compressed air to pass into the chamber 20; however, when the index pin is moved into table releasing position as shown in Fig. 3 of the drawings, the annular groove 28 is moved out of registration with the duct 21 and the passage of compressed air into the chamber 20 is cut off. The combined index pin and valve 24 is provided with a vertically or longitudinally extending passageway 29 which has communication with the duct 21 at the side of the valve opposite from the inlet of the duct and when the combined index pin and valve 24 is moved into its unlocking or table releasing position the lower end of the passageway 29 has atmospherical communication as clearly shown in Fig. 3 of the drawings, which permits the compressed air to be bled from the chamber 20, to relieve the pressure against the disc 16 and consequently relieve the pressure of the head 8 against the sleeve 9 which will permit the table 4 to be rotated.

The lower end of the combined index pin and valve 24 is flatted providing a tongue 30 which is connected by means of a link 31 to an operating rod 32. The operating rod 32 extends through a suitable bearing sleeve 33 mounted in the pillow block 1 and into the hub 34 of the operating lever or handle 35. Suitable jamb nuts 36 are mounted on the rod 32 to prevent longitudinal movement thereof.

From the foregoing description taken in connection with the accompanying drawings it will be apparent that the improved index base may be controlled by the operation of a single lever and that the movable table 4 will be securely and rigidly held in adjusted positions against rotary or vibratory movement relative to the pillow block 1 and also that a minimum amount of expensive machined structure is embodied in the improved index base.

The table 4 is provided with suitable lubricant ducts or passageways 40 having communication with the various bearing surfaces of the table and pillow block and the pillow block is also provided with suitable recessed projections 41 adapted to receive bolts or the like thereon for attaching the index base to the table of a machine upon which it is to be used.

An indicator structure as shown in Fig. 6 of the drawings is provided to permit the user of the index base to readily determine just when the index pin 25 is in registration with one of the recesses 26. This indicator comprises a spring pressed plunger 44 which is slidably supported in a suitable recess 45 in a projection 46 formed upon the pillow block 1. The plunger 44 is adapted to engage in suitable recess 47 formed in the undersurface of the table 4 and when the projection is in engagement with one of the recesses it is an indication that the combined index pin and valve 24 is in alignment with one of the recesses 26. A spring 48 is mounted in the recess 45 and urges the plunger 44 outwardly. The tension of the spring 46 is regulated by a tensioning screw 49 which is carried by the boss 48. A set screw 50 extends transversely into the recess 45 and into a recess 51 formed in the plunger 44 for preventing rotary movement of the plunger.

It is, of course, to be understood that the invention may be constructed in other manners and the parts associated in other relations and, therefore, I do not desire to be limited in any manner except as set forth in the claims hereunto appended.

Having thus described my invention what I claim is:

1. In an index base, a movable table, compressed air locking means for locking the table against movement, and a combined index pin and valve for controlling passage of compressed air to said locking means.

2. In an index base, a pillow block, a table movably carried thereby, means adapted to be acted upon by compressed air for locking the table against movement, and a combined valve and index pin carried by said pillow block for controlling the passage of compressed air to said means.

3. In an index base, a pillow block, a table movably carried thereby, means adapted to be acted upon by compressed air for locking the table against movement, and a combined valve and index pin carried by said pillow block for controlling the passage of compressed air to said means, and a lever connected to said combined valve and index pin for operating it.

4. In an index base, a pillow block, a table movably carried thereby, compressed air operated means for locking said table against movement, a combined valve and index pin carried by said pillow block for controlling the passage of compressed air to said locking means, and an indicator structure carried by said pillow block and co-operating with said table to indicate the relative positions of the table and combined index pin and valve.

5. In an index base, a pillow block, a work carrying table rotatably supported by said pillow block, a pin extending axially through said pillow block and table, a clamping head on said pin and a disc carried by said pin adapted to be acted upon by compressed air for forcing said clamping head in clamping engagement with said table to lock the table against movement.

6. In an index base, a pillow block, a work carrying table rotatably supported by said pillow block, a pin extending axially through said pillow block and table, a clamping head on said pin and a disc carried by said pin adapted to be acted upon by compressed air for forcing said clamping head in clamping engagement with said table to lock the table against movement, and a valve carried by said pillow block for controlling the action of compressed air on said disc.

7. In an index base, a pillow block, a work carrying table rotatably supported by said pillow block, a pin extending axially through said pillow block and table, a clamping head on said pin and a disc carried by said pin adapted to be acted upon by compressed air for forcing said clamping head in clamping engagement with said table to lock the table against movement, a combined index pin and valve carried by said pillow block and controlling the passage of compressed air to said disc.

8. In an index base, a pillow block, a work carrying table rotatably supported by said pillow block, a pin extending axially through said pillow block and table, a clamping head on said pin and a disc carried by said pin adapted to be acted upon by compressed air for forcing said clamping head in clamping engagement with said table to lock the table against movement, a combined index pin and valve carried by said pillow block and controlling the passage of compressed air to said disc, a lever connected to said combined index pin and valve for moving it.

9. In an index base, a movable table, compressed air locking means for locking the table against movement, and a combined index pin and valve for controlling passage of compressed air to said locking means, said combined index pin and valve provided with a groove adapted to permit the bleeding of compressed air from said locking means at pre-determined times.

10. In an index base, a pillow block, a table movably carried thereby, compressed air operated means for locking said table against movement, a combined valve and index pin carried by said pillow block for controlling the passage of compressed air to said locking means, said combined index pin and valve provided with a groove adapted to permit the bleeding of compressed air from said locking means at pre-determined times.

11. In an index base, a pillow block, a table movably carried thereby, compressed air operated means for locking said table against movement, a combined valve and index pin carried by said pillow block for controlling the passage of compressed air to said locking means, said combined index pin and valve provided with a groove adapted to permit the bleeding of compressed air from said locking means at pre-determined times, and an indicator carried by said pillow block and co-operating with said table to indicate the relative positions of the combined index pin and valve and said table.

12. In an index base, a pillow block, a work carrying table movably carried thereby, a pin extending axially through the pillow block and table, a clamping head on said pin, said pillow block provided with a recess surrounding a portion of said pin, a fluid tight closure for said recess, a disc on said pin and in said recess and adapted to be acted upon by compressed air entering the recess for forcing said clamping head in clamping engagement with said table to lock the table against movement.

13. In an index base, a pillow block, a work carrying table movably carried thereby, a pin extending axially through the pillow block and table, a clamping head on said pin, said pillow block provided with a recess surrounding a portion of said pin, a fluid tight closure for said recess, a disc on said pin and in said recess and adapted to be acted upon by compressed air entering the recess for forcing said clamping head in clamping engagement with said table to lock the table against movement, and a combined index pin and valve carried by said pillow block for controlling passage of compressed air into said recess.

14. In an index base, a pillow block, a work carrying table movably carried thereby, a pin extending axially through the pillow block and table, a clamping head on said pin, said pillow block provided with a recess surrounding a portion of said pin, a fluid tight closure for said recess, a disc on said pin and in said recess and adapted to be acted upon by compressed air entering the recess for forcing said clamping head in clamping engagement with said table to lock the table against movement, and a combined index pin and valve carried by said pillow block for controlling passage of compressed air into said recess, said combined index pin and valve provided with a groove to permit bleeding of compressed air from said recess at pre-determined times.

15. In an index base, a pillow block, a work carrying table movably carried thereby, a pin extending axially through the pillow block and table, a clamping head on said pin, said pillow block provided with a recess surrounding a portion of said pin, a fluid tight closure for said recess, a disc on said pin and in said recess and adapted to be acted upon by compressed air entering the recess for forcing said clamping head in clamping engagement with said table to lock the table against movement, a combined index pin and valve carried by said pillow block for controlling passage of compressed air into said recess, said table provided with a plurality of recesses adapted to receive said combined index pin and valve, and a lever for moving said pin.

16. In an index base, a movable table, compressed air locking means for locking the table against movement, a combined index pin and valve for controlling passage of compressed air to said locking means, said table provided with a plurality of recesses adapted to receive said combined index pin and valve, and a lever for moving said combined index pin and valve.

17. In an index base, a pillow block, a table movably carried thereby, compressed air operated means for locking said table against movement, a combined valve and index pin carried by said pillow block for controlling the passage of compressed air to said locking means, said table provided with a plurality of recesses adapted to receive said combined index pin and valve, and a lever for moving said index pin and valve into and out of said recesses and for controlling operation of said locking means.

18. In an index base, a pillow block, a table movably carried thereby, compressed air operated means for locking said table against movement, a combined valve and index pin carried by said pillow block for controlling the passage of compressed air to said locking means, said table provided with a plurality of recesses adapted to receive said combined index pin and valve, a lever for moving said index pin and valve into and out of said recesses and for controlling operation of said locking means, and an indicator structure carried by said pillow block and co-operating with said table to indicate the relative positions of the recesses and combined index pin and valve.

In testimony whereof I affix my signature.

EUGENE F. MURRAY.